Sept. 8, 1942.  F. ROGERS  2,295,292
FISH LURE
Filed Aug. 7, 1941
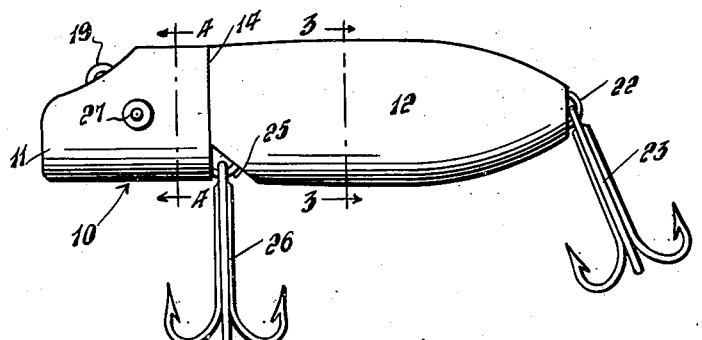
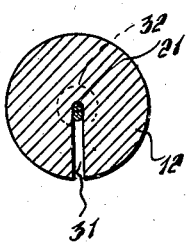
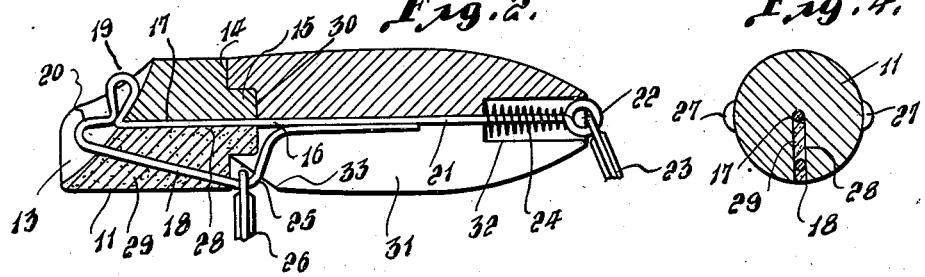
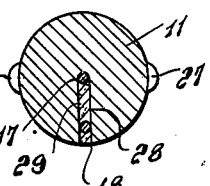
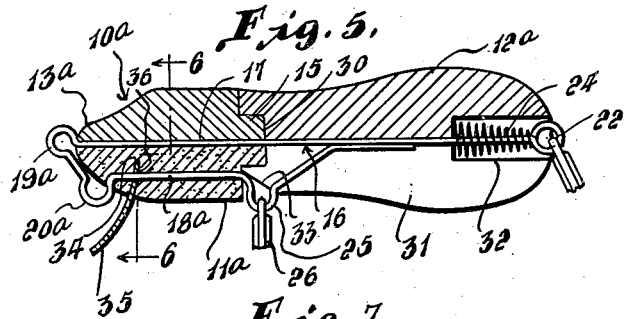
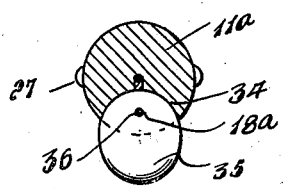
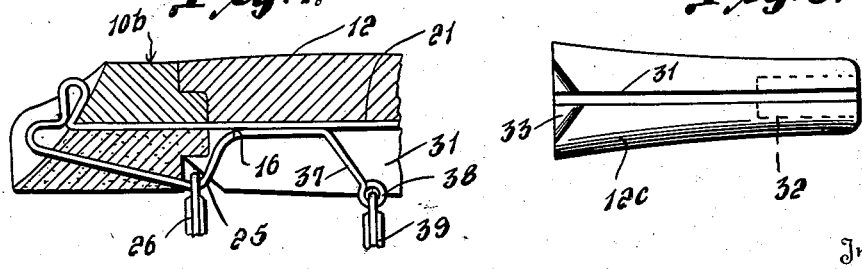
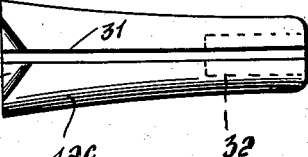
Inventor
Frank Rogers
By L. F. Randolph
Attorney Patented Sept. 8, 1942

2,295,292

UNITED STATES PATENT OFFICE 2,295,292

FISH LURE

Frank Rogers, Hoosick Falls, N. Y.

Application August 7, 1941, Serial No. 405,845

8 Claims. (Cl. 43—46)

This invention relates to a novel construction of fish lure and more particularly to a fish lure formed of a separate head portion and body portion provided with means whereby the head and body portion may be readily connected or detached.

More particularly, it is an aim of the invention to provide an improved construction of fish lure wherein a plurality of body portions of different shapes and sizes can be detachably connected to a head portion, or wherein any one of a plurality of body portions may be used with a plurality of head portions to thereby provide a plurality of combinations of different sizes and shapes as well as of different color combinations.

More particularly, it is an aim of the invention to provide improved connecting means between the head and body including a projection and recess connection at the adjacent ends of the head and body, and spring means carried by a rod or strand of wire, which is anchored in the head for yieldably urging the body toward the head for retaining the parts attached and for affording means whereby the body can be quickly and easily detached from the head.

Still a further aim of the invention is to provide a novel means of which the head and body connecting means form a part for attaching a plurality of fishhooks to the lure and for adjustably attaching a leader or fishing line to the head portion of the lure.

Other objects and advantages of the invention will hereinafter become more fully apparent from the following description of the drawing, which illustrates preferred embodiments of the invention, and wherein—

Figure 1 is a side elevational view of one construction of the fish lure, shown assembled, Figure 2 is a longitudinal substantially central vertical sectional view of the same, partly in elevation, Figures 3 and 4 are cross sectional views taken substantially along the planes of the lines 3—3 and 4—4, respectively, of Figure 1, Figure 5 is a view similar to Figure 2 of a slightly modified form of the invention, Figure 6 is a cross sectional view of the fish lure, shown in Figure 5, and taken substantially along a plane indicated by the line 6—6 of Figure 5, Figure 7 is a fragmentary view of another modified form of the invention and similar to Figure 2, and Figure 8 is a bottom plan view of a fish lure body of a slightly different shape from the bodies shown in Figures 1, 5 and 7.

Referring more particularly to the drawing, wherein like reference characters designate like or corresponding parts throughout the different views, and referring particularly to Figures 1 to 4, 10 designates generally one embodiment of the fish lure including a head portion 11 and a body portion 12.

As seen in Figure 2, the head portion 11 is provided with a concave face or forward end 13 which is inclined upwardly and rearwardly. The rear end of the head portion 11 is substantially flat, as seen at 14 and is provided with a restricted extension 15 which projects therefrom. A rod or strand of wire 16 is provided with the portions 17 and 18 which extend longitudinally through the head 11 and which are anchored therein. The portion 17 is disposed substantially in the longitudinal center of the head 11 and substantially axially thereof, and the portion 18 is disposed therebeneath and is inclined downwardly and away from the portion 17 and toward the rear end of the head. Between the portions 17 and 18, the strand of wire 16 includes an intermediate portion which projects from the concave face 13 and which is bent to provide two leader or fish line receiving eyes or loops 19 and 20. The eye 19 is disposed above the eye or loop 20 and both of said eyes are disposed in the concave face 13 for a purpose, which will hereinafter be more fully explained. The end of the strand 16, which forms a continuation of its portion 17, projects through the extension 15 and outwardly thereof to form the end 21 the terminal of which is bent to provide an eye 22 which is adapted to be attached to a multiple barbed fishhook 23. An expansion coil spring 24 is mounted on the strand end 21 and the eye 22 forms an abutment for one end thereof. The opposite end of the strand 16, which forms a continuation of the portion 18 projects from the back face 14 of the head 11, adjacent its bottom and is bent upwardly, adjacent thereto to form a loop 25 to which is adapted to be attached a multiple barbed fishhook 26. Said last-mentioned end of the strand 16, from the loop 25, extends upwardly to the end 21 and is then bent to extend parallel thereto and is disposed thereagainst and may, if desired, be secured thereto as by means of welding. The head 11 is preferably provided with members 27 which project outwardly from the sides thereof and which are constructed and colored to simulate eyes.

The head 11 is preferably provided with a perpendicular slot 28 which opens outwardly of its bottom and of its forward and rear ends and in which the portions 17 and 18 are disposed and which is adapted to be filled with a cement or plastic, as indicated at 29, Figure 4, for anchoring the strand of wire 16 thereto and its portions 17 and 18 therein.

The body portion 12 is provided with an outwardly opening recess 30 in its forward end which is shaped and sized to snugly receive the extension 15. Body 12 is provided with a perpendicular slot 31 which extends from end to end thereof and which opens outwardly of its underside, and is also provided with a longitudinally extending recess 32 which opens outwardly of its rear end and which communicates with the slot 31. The slot 31 is adapted to receive the end 21 of the strand 16 and likewise the other end thereof and the recess 32 is adapted to house the expansion coil spring 24, the opposite, inner end of which bears against the inner end of the recess 32 for urging the body 12 toward the head 11 to hold the projection 15 in engagement with the recess 30 and the adjacent ends of the head 11 and body 12 in abutting relationship, as best seen in Figures 1 and 2. The eye 22 projects from the recess 32 sufficiently to allow the hook 23 to pivot thereon. The underside of the body 12, at its forward end, is cut-out at an oblique angle, as seen at 33 to provide a space between the head 11 and body 12 in which the loop 25 is disposed to permit the hook 26, which depends therefrom, to pivot relatively thereto.

It will be obvious that with the head 11 and body 12 connected, as shown in Figures 1 and 2, that the body 12 can be moved away from the head 11 by grasping the head in one hand and the body in the other and pulling the parts apart thereby compressing the spring 24 and moving the projection 15 out of engagement with the recess or socket 30 to allow the body 12 to be swung upwardly, at its forward end, relatively to the head 11 and thereby detached from the head 11 and from the strand of wire 16. Similarly, the body 12 can be connected to the head 11 by applying the recess 32 to the spring 24 and by then forcing the body 12 away from the head 11 to compress the spring 24 sufficiently so that the forward end of the body 12 can be swung downwardly to aline the socket or recess 30 with the projection 15, after which the body 12 can be released to allow the spring 24 to project it toward the head 11 to cause the recess or socket 30 to engage the extension 15 for interlocking the parts.

The eye 19 is adapted to be connected to a leader or line for deep or submerged fishing and the loop 20 is adapted to be connected to a leader or line for surface fishing.

A slightly modified form of lure, designated 10a is shown in Figures 5 and 6, and includes a head 11a and a body 12a. The head 11a is smaller in diameter than the head 11 and is provided with a tapered nose or forward end 13a. The upper submerged leader eye 19a of the fish lure 10a is disposed substantially in alinement with the longitudinal center of the lure while the lower surface leader loop 20a is disposed therebeneath and adjacent the underside of the head 11a. The strand portion 18a is disposed substantially parallel to the strand portion 17, and therebeneath, and the strand portion 17 of the lure 10a is similarly disposed to the strand portion 17 of the lure 10. The head 11a is also provided with a transverse downwardly opening slot 34, as best seen in Figure 6, for receiving the upper portion of an action spoon 35 which portion is provided with an opening 36 through which the strand portion 18a extends for anchoring the spoon 35 to the head 11a.

The body 12a is of a slightly different contour from the body 12 in that the body 12a is enlarged adjacent its rear end and is tapered towards its forward end, whereas the body 12 is of substantially the same diameter from adjacent its forward end to adjacent its tail from which latter point the body tapers gradually toward the tail. It will be obvious that the lure shown in Figure 5 is shaped to simulate a mouse. In all other respects the lure 10a corresponds to the lure 10, and the corresponding parts thereof, bearing reference characters corresponding to the same parts of the lure 10 will not therefore, be described. Furthermore, in view of the detailed description of the construction and operation of the lure 10 a further description of the lure 10a is deemed unnecessary.

Another, slightly modified form of the invention is illustrated in Figure 7, wherein a portion of a lure, designated generally 10b is shown, which corresponds to the lure 10 in every respect except in that the end of the strand 16, adjacent the loop 25, is extended to provide a portion 37 which projects downwardly from the end 21 and which terminates in a loop or eye 38 which projects partly from the body of the slot 31 and on which is adapted to be pivotally mounted a third fishhook 39 so that the lure 10b is provided with a fishhook, not shown, at its tail end, a fishhook 26 which depends from the forward end of the body 12 thereof, and a fishhook 39 which depends from the body 12, intermediate of its ends.

In Figure 8, a lure body 12c is shown the contour of which is slightly different from the lure bodies 12 and 12a in that it tapers from its forward to its rear end. The interior and the forward end construction of the lure body 12c is identical with that of the lure bodies 12 and 12a.

It is to be understood that the head portions and body portions may be of any desired color or color combinations, and that various head portions and body portions of different sizes and shapes may be provided to be assembled in any desired combinations and that the interior construction of all of the lure bodies will be substantially identical and the lengths of all the bodies will be substantially the same. Furthermore, the size and shape of the rear ends of all of the head portions will be the same to adapt any of the bodies to any of the head portions.

Various other modifications and changes are contemplated and may obviously be resorted to, provided they fall within the spirit and scope of the invention as hereinafter defined by the appended claims, as only preferred embodiments of the invention have been disclosed.

I claim as my invention:

1. A fish lure comprising a body, a separate head, interengaging means on the head and body, a rod projecting from the head, said body being provided with a longitudinal slot opening laterally thereof and extending from end to end thereof for receiving said rod, and an expansion coil spring carried by the free end of said rod for engaging said body for urging it toward the head.

2. A fish lure comprising a body portion, a head portion, said body portion being provided with a recess in its forward end, said head portion having a projection at its rear end to engage in said recess, a rod projecting from the rear end of said head and extending longitudinally through the body, said rod being removably mounted in the body, and expansion coil spring means carried by said rod for engaging against and urging the body toward the head, said body being provided with a longitudinal slot extending from end to end thereof and opening laterally thereof for detachably receiving said rod.

3. A fish lure comprising a body portion, a head portion, said body portion being provided with a recess in its forward end, said head portion having a projection at its rear end to engage in said recess, a rod projecting from the rear end of said head and extending longitudinally through the body, said rod being removably mounted in the body, and expansion coil spring means carried by said rod for engaging against and urging the body toward the head, said body being provided with a longitudinal slot extending from end to end thereof and opening laterally thereof for detachably receiving said rod, said body having a longitudinal recess opening outwardly of its rear end and communicating with said slot for receiving said spring.

4. A fish lure comprising a head portion having a restricted projection at its rear end, a body portion provided with an outwardly opening recess in its forward end for receiving said projection, said body portion being provided with a longitudinal slot extending from end to end thereof and opening laterally thereof, a strand of wire having one end projecting from the rear end of said head and removably disposed in said slot, said body portion being provided with a longitudinally extending recess opening outwardly of its rear end and communicating with the slot, and an expansion coil spring carried by said end of the strand and disposed in said recess for urging the body toward the head.

5. A fish lure as in claim 4, said strand having an intermediate portion projecting from the forward end of the head, said intermediate portion being bent to provide a fish line engaging eye, the opposite end of said strand extending rearwardly through said head and into said slot and including an exposed portion, and said exposed portion of the strand forming a fishhook engaging loop.

6. A lure as in claim 4, the terminal of said end of the strand being bent to form a fishhook engaging eye, said eye forming an abutment for one end of said spring, the opposite end of said strand projecting rearwardly from said head into said slot and having portions thereof projecting outwardly of the slot and forming fishhook attaching portions.

7. A fish lure as in claim 4, said strand of wire having a looped portion projecting outwardly from the forward end of said head, said looped portion being bent to provide a plurality of fish line receiving eyes, and said eyes being disposed at different levels relatively to the longitudinal axis of the fish lure.

8. A lure as in claim 4, said head being provided with a transverse slot opening outwardly of its underside, a spoon having a portion disposed in said slot, said spoon portion being provided with an opening through which a portion of said strand of wire extends for anchoring the spoon in the head.

FRANK ROGERS.